United States Patent
Ioffe et al.

[15] 3,659,070
[45] Apr. 25, 1972

[54] ELECTRO-EROSION MACHINE FOR MACHINING THROUGH HOLES

[72] Inventors: Vladimir Fedorovich Ioffe, Kirovsky prospekt, 69/71, kv. 5; Garri Shmilevich Roitshtein, Kirovsky prospekt, 65, kv. 9; Iosif Yakovlevich Vyatskin, Leningrad ulitsa Iluskaya, II, kv. 42; Vladimir Grigorievich Tsypkin, Leningrad ulitsa Gaviskaya, 3, korpus I, kv. 12; Vladimir Nikolaevich Alexandrov, Leningrad Chkalovsky prospekt, 14, kv. 25, all of Leningrad; Gennady Gavrilovich Semin, ulitsa Tsentralnava, 15, kv. 1, Fryazino Moskovskoi Oblasti, all of U.S.S.R.

[22] Filed: June 17, 1969

[21] Appl. No.: 833,966

[52] U.S. Cl. ................................ 219/69 E, 219/69 G
[51] Int. Cl. ............................................ B23k 9/16
[58] Field of Search .................... 219/69 E, 69 G, 69 V, 69 D

[56] References Cited

UNITED STATES PATENTS

| | | | |
|---|---|---|---|
| 2,778,925 | 1/1957 | Gross et al. | 219/69 E |
| 3,125,700 | 3/1964 | Bentley et al. | 219/69 G |
| 2,730,602 | 1/1956 | Porterfield | 219/69 V |
| 2,974,216 | 3/1961 | Inoue | 219/69 V |

Primary Examiner—J. V. Truhe
Assistant Examiner—Hugh D. Jaeger
Attorney—Waters, Roditi, Schwartz & Nissen

[57] ABSTRACT

An electro-erosion machine for machining through holes which ensures highly arcuate spacing of holes machined in articles involved, as well as strict similarity thereof and features high throughput capacity due to full automation of its entire working cycle, which makes this machine applicable for large-scale production.

5 Claims, 3 Drawing Figures

PATENTED APR 25 1972 3,659,070

ELECTRO-EROSION MACHINE FOR MACHINING THROUGH HOLES

The present invention relates to electro-erosion machines adapted for machining with one tool electrode a series of similar and accurately spaced holes or cavities in articles, such machines being employed, for example, when producing one-piece grids or grid units from plain caps for evacuated valves or tubes.

Known in the art are electro-erosion machines adapted for machining with one tool electrode a series of through holes in articles, such machines comprising a mechanism for feeding the tool electrode which is fixed on a slide block which also mounts a limiter capable of restricting the travel of stop blocks which fix the tool electrode in its topmost and bottommost positions, and a mechanism for fixing the workpiece being machined, said latter mechanism being provided with a device for properly positioning the workpiece relative to the tool electrode, which device is set on the same spindle as the workpiece being machined.

Said prior-art machines however fail to ensure sufficiently accurate machining of similar holes in the article involved, such that said holes are spaced strictly regularly with respect to one another, since compensation for the wear of the tool electrode in such machines is attained only partially by the operator, which fact results in a drastic drop in the machine capacity.

Moreover, proper positioning of the workpiece relative to the tool electrode, for example, turning of the workpiece about its axis for next hole to be machined requires a special operation to be performed without electrical or mechanical co-operation with other units of the machine which also affects adversely the machine capacity and precludes the use of such machines for large-scale production of the articles of the type described.

It is an object of the present invention to eliminate the above-listed disadvantages.

The specific object of the invention is to provide an electro-erosion machine which will ensure highly accurate spacing of holes machined in articles and their strict similarity, the machine featuring high capacity due to full automation of the entire working cycle thereof, and being applicable for large-scale production.

Said object is attained due to the fact that in the electro-erosion machine of the type described, comprising a mechanism for feeding the tool electrode with a limiter adapted to restrict its travel and a mechanism for fixing the workpiece provided with a device for proper positioning of the workpiece relative to the tool electrode according to the invention the limiter that restricts the travel of the feed mechanism is provided with a device which cyclically changes the position of the limiter and operates at the moment when the tool electrode is outside the cutting zone and actuates the device for proper positioning of the workpiece. Due to such an arrangement each machining of successive holes of the same shape in the workpiece is effected by non-worn faces of the tool electrode.

As a device for cyclically changing the position of the limiter an electric motor can be employed, kinematically coupled through a gear train with said limiter.

The device for proper positioning of the workpiece relative to the tool electrode should preferably include a slotted disc, the number of slits therein being equal to that of the number of holes to be machined in the workpiece, through which slits a light source sends pulses to actuate a photocell which controls a drive of the mechanism that fixes the workpiece being machined.

The electro-erosion machine in accordance with the present invention, is highly instrumental in solving the objects set forth hereinabove and is applicable, for example, in the electronic art for producing vacuum tubes or valves when manufacturing both separate grids and integrated grid units from plain caps for oscillator and modulator tubes or valves. The manufacturing technique of such articles proves to be considerably simplified, since the present machine is equipped with simple and reliable operatively interconnected devices for compensating the wear of the tool electrode and for exact positioning of the latter relative to the article being produced. When manufacturing articles on such machines the operator need only fix the workpiece and the tool electrode and then remove the completed article. This in turn, makes it possible to organize the process according to a multimachine attendance schedule.

For a better understanding of the present invention, discussed hereinbelow is a detailed description of an examplary embodiment of the present electro-erosion machine, reference being made to the accompanying drawings, wherein.

Figures 1, 2, 3:
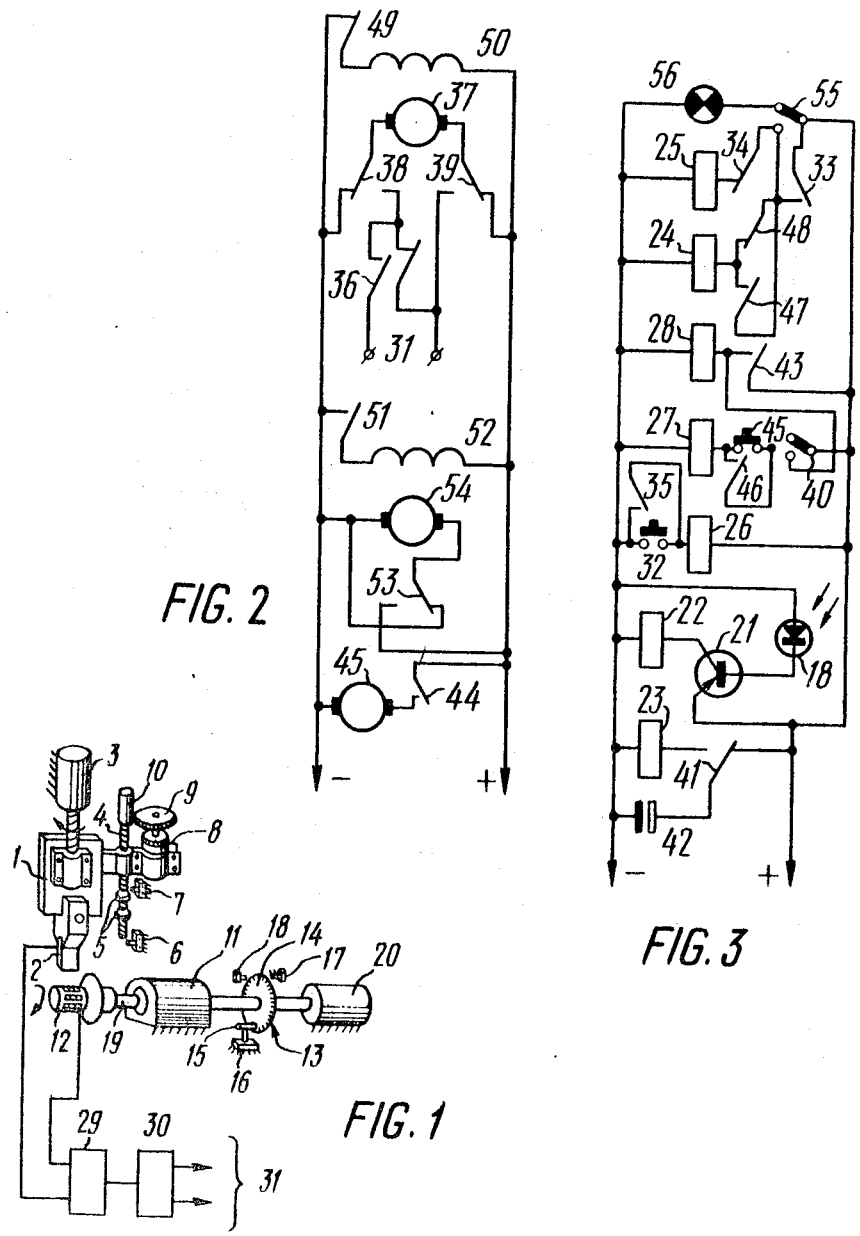
FIG. 1 shows diagrammatically the primary mechanical unit of the electro-erosion machine according to the invention.
FIG. 2 is a schematic of the power supply circuit of the electric motors of the machine.
FIG. 3 is a schematic of the electric control circuit of the machine electric motors, according to FIG. 2.

The machine of the invention comprises the following primary units: a mechanism 1 for feeding a tool electrode 2, said mechanism being driven by an electric motor 3; a limiter 4 that restricts the travel of the feed mechanism 1, provided with projection stops 5 that interact with a limit switch 6 of the lower position of the electrode 2 and with a limit switch 7 of the upper position thereof; an actuating means comprising an electric motor 8 kinematically coupled with the limiter 4 of the feed mechanism 1 through gears 9 and 10; a mechanism 11 for fixing a workpiece 12 to be machined, which mechanism has a device for properly positioning turning the workpiece 12 relative to the electrode 2, said device comprising a disc 13 with slits 14 and a stop 15 that interacts with a limit switch 16, a light source 17 and a photodiode 18. The disc 13 is rigidly mounted on a spindle 19 of the mechanism 1 connected with an electric motor 20.

The control circuit of the machine in the exemplary embodiment described herein comprises an amplifier built around a transistor 21, relays 22, 23, 24, 25, 26, 27 and a time relay 28, as well as a source 29 of working pulses and a spark gap adjuster 30 serving to adjust the gap between the electrode 2 and the workpiece 12, both the source 29 and the adjuster 30 being connected to the electrode 2 and the workpiece 12. The output of the spark gap adjuster 30 through terminals 31 is coupled to the power supply circuit of the electric motor 3.

The machine of the invention operates as follows.

With starting button 32 depressed for the machining to commence, the relay 26 operates and through its normally open contacts 33 voltage is fed to the winding of the relay 25 along the following circuit; the winding of the relay 25, closed contact 34 of the relay 24, and normally open contact 33. When the relay 25 operates it blocks the button 32 with one of its normally open contact 35, and with its other normally open contact 36 it closes the supply circuit of an armature winding 37 of the electric motor 3 along the following circuit: output terminal 31 of the spark gap adjuster 30, normally open contact 36, switching contacts 38 of the relay 27, armature winding 37, switching contacts 39 of the relay 27, and terminal 31. The machining of the first slot in the workpiece 12 is commenced. The feeding mechanism 1 travels towards the workpiece 12, the electrode 2 "pierces" a slot in it, after which the lower limit switch 6 operates and switches over its contacts 40 in the circuit of the relay 27. The winding of the relay 27 is then deenergized and the switching contacts 38 and 39 thereof connect the armature winding 37 of the electric motor 3 to the power supply busbars.

The electrode 2 is quickly lifted, thus being removed from the cutting zone.

At the same time normally closed contact 41 of the relay 27 connects a capacitor 42 to the supply busbars whereby the latter charges, the normally open contacts 40 block normally open contacts 43 which trigger the time relay 28, this blocking being effected for a short time, after which said relay 28 starts to hold itself and actuating contacts 44 are switched with a time delay, said contacts closing the supply circuit of an armature winding 45 of the electric motor 8. The delay of the time relay 28 with the shaft of the electric motor 8 rotating steadily, determines the travel of the stops 5 and is equal to the increment of the path to be covered by the electrode 2 for properly sizing the hole in the workpiece 12 with its non-worn side faces and thus to compensate for the wear of the tool electrode during the formation of the preceding hole.

When the feed mechanism 1 with the electrode 2 reaches its topmost position, the upper limit switch 7 operates and the winding of the relay 27 is coupled to the supply busbars along the following circuit: the winding of the relay 27, normally open contact 45 of the upper limit switch 7, and normally closed contact 40 of the lower limit switch 6. When the relay 27 operates it blocks contacts 45 of the upper limit switch 7 with its normally open contact 46, and the switching contacts 38 and 39 of said relay disconnect the armature winding 37 of the electric motor 3 from the supply busbars, while the normally closed contacts 41 couple the capacitor 42 to the winding of the relay 23. The discharge of the capacitor 42 to the winding of the relay 23 causes the latter to operate.

The discharge time of the capacitor 42 determines the duration of the operation of relay 23. With its normally open contacts 47 the relay 23 closes the supply circuit of the winding of the relay 24.

While the photodiode 18 is lighted, normally closed contacts 48 of the relay 22 are open and the winding of the relay 24 is supplied along the following circuit: winding of the relay 24, normally open contact 47, and normally contact 33. As the relay 24 operates it deenergizes excitation winding 50 of the electric motor 3 with its normally closed contacts 49, and with its normally open contacts 51 it couples excitation winding 52 of the electric motor 20 to the supply busbars. At the same time switching contacts 53 of the relay 24 couple armature winding 54 of the electric motor 20 to the supply busbars.

The workpiece 12 is turned through a predetermined angle which depends on the distance between two neighboring slits 14 of the disc 13. The disc 13 turning through an angle in excess of the slit width shuts off the luminous flux incident on the photodiode 18, the transistor 21 is thus thrown out of conduction, the relay 22 becomes deenergized and its normally closed contacts 48 block the normally open contacts 47. At the same time the limit switch 16 closes its normally closed contacts 55, whereby the winding of the relay 24 becomes supplied along the following circuit: winding of the relay 24, normally closed contact 48, and contacts 55.

When the disc 13 turns through the angle determined by the distance between two neighboring slits 14, the luminous flux from the light source 17 through the second becomes incident on the photodiode 18. The transistor 21 becomes conductive, the relay 22 operates and with its normally closed contacts 48 breaks the supply circuit of the relay 24. In its turn the relay 24 with its normally open contacts 53 breaks the supply circuit of armature winding 54 of the electric motor 20. The making of the normally open contacts 53 brings the electric motor 20 into the braking stage.

The normally closed contacts 34 close the supply circuit of the relay 25 along the following circuit: winding of the relay 25, normally closed contact 34, and normally closed contacts 55 of the limit switch 16. The electrode 2 is fed towards the workpiece for "piercing" the second slot therein. When the limit switch 6 operates, the electrode 2 is quickly lifted until the limit switch 7 operates.

Further, the operation cycle of the machine is similar to that described hereinabove.

The last slot having been "pierced," the electrode 2 is lifted, the workpiece 12 turns through the predetermined angle, and the stop 15 fixed on the disc 13 presses the button of the limit switch 16 whereby its normally closed contacts break and the normally open contacts 55 close.

This results in the lighting of a pilot lamp 56 which indicates that the article is ready. The winding of the relay 25 becomes deenergized and its contacts 36 disconnect the armature winding 37 of the electric motor 3 from the output of the spark gap adjuster 30, whereby the travel of the electrode 2 towards the workpeice 12 is precluded.

In the machine described herein as it can be seen from the disclosure the electric motor 8 is used as a device for cyclically changing the position of the limiter 4, however, any other similar electromechanical or mechanical means can be used for the purpose, which enables the changing of the position of the stops 5 relative to the limit switches 6 and 7 and thereby compensating for the wear of the tool electrode.

What is claimed is:

1. An electro-erosion machine for machining holes in a workpiece, said machine comprising a tool electrode, a feed mechanism supporting said electrode and capable of advancing the electrode into a cutting zone proximate the workpiece and retracting the electrode to a displaced position from the workpiece, a limiter connected to the electrode for travel therewith and including adjustable means to restrict the travel of said electrode, support means for fixing the workpiece to be machined opposite the tool electrode, said support means including means for sequentially changing the position of the workpiece relative to the electrode so that holes are machined in successive portions of the workpiece, actuater means for cyclically changing the position of said adjustable means, and means to activate said actuator means when the tool electrode is outside said cutting zone after each hole cutting operation, such that each successive hole in the workpiece will be machined by remaining unused side faces of the electrode which are still free from wear, said means for changing the position of the workpiece being actuated with the actuation of said actuator means.

2. An electro-erosion machine as claimed in claim 1, wherein said actuator means for cyclically changing the position of said limiter includes an electric motor and a gear train coupling said motor with said limiter.

3. An electro-erosion machine as claimed in claim 1, wherein said means for changing the position of the workpiece relative to the electrode includes a slotted disc having a number of slits therein equal to that of the number of holes to be machined in the workpiece, said machine further including a light source and photo-cell in communicating relation and through which slits the light source transmits light pulses to actuate the photo-cell to control the means which sequentially changes the position of the workpiece.

4. An electro-erosion machine as claimed in claim 2, wherein said limiter includes a threaded displaceable screw, said screw including a pair of axially spaced stops operatively associated with said means for cyclically changing the position of the adjustable means.

5. An electro-erosion machine as claimed in claim 4, wherein said feed mechanism further includes a pair of spaced switching means operatively associated with said spaced stops for halting the travel of the electrode.

* * * * *